United States Patent [19]
Zulauf

[11] Patent Number: 5,482,043
[45] Date of Patent: Jan. 9, 1996

[54] METHOD AND APPARATUS FOR TELEFLUOROSCOPY

[76] Inventor: David R. P. Zulauf, 790 Young Grade Rd., Yakima, Wash. 98908

[21] Appl. No.: 240,997

[22] Filed: May 11, 1994

[51] Int. Cl.$^6$ ........................................ A61B 8/00
[52] U.S. Cl. ................ 128/660.04; 128/904; 378/98.2
[58] Field of Search ................ 128/660.01, 660.04, 128/660.07, 903, 904; 378/42, 98.2, 98.3, 4, 6

[56] References Cited

U.S. PATENT DOCUMENTS

| | | | |
|---|---|---|---|
| 4,058,833 | 11/1977 | Meyer | 378/98.3 |
| 4,680,628 | 7/1987 | Wojcik et al. | 378/98.2 |
| 5,247,555 | 9/1993 | Moore et al. | 378/4 |

*Primary Examiner*—George Manuel
*Attorney, Agent, or Firm*—Stratton Ballew

[57] ABSTRACT

A method and apparatus for telefluoroscopy, generating telecommunications transmitted full motion fluoroscopic video images of sufficient clarity and detail to enable a radiologist at a site remote from the fluoroscopy examining site to render a medically accurate diagnosis from the displayed video image.

15 Claims, 3 Drawing Sheets

METHOD AND APPARATUS FOR TELEFLUOROSCOPY

TECHNICAL FIELD

This invention relates to a method and apparatus for telefluoroscopy, and more particularly involves the transmission of telefluoroscopic video images of sufficient clarity and detail to enable a radiologist at a site remote from the fluoroscopy examining site to render a medically accurate diagnosis.

BACKGROUND OF THE INVENTION

Fluoroscopy is a method of performing X-ray fluoroscopic medical diagnostic procedures. Fluoroscopic procedures include upper GI series, contrast enema studies, esophagography, voiding cystourethrography, T-tube cholangiography, sinography, chest fluoroscopy, and a wide variety of other medical procedures.

Fluoroscopy can be used to perform videofluoroscopy or to obtain spot-films. Videofluoroscopy creates a full motion X-ray video image, and is used to diagnostically evaluate dynamic physiological processes such as swallowing, bowel motion, and other physiological processes involving temporal factors. This live videofluoroscopic image is also used to monitor the adequacy of contrast administration, which involves the use of various X-ray opaque chemical compounds injected into the patient. Videofluoroscopy is also useful to optimize "spot" filming for documentation of both normal and abnormal findings. The fluoroscopic X-ray administration to the patient is controlled by a radiologic professional who is physically present at the site where the fluoroscopic examination occurs. When insufficient demand for radiologic medical services to economically support a full-time radiologist. This situation will be exacerbated by increasing service demands on radiologists, and declining professional reimbursement by government agencies. Due to these economic factors, many rural/small health care facilities staffed with part-time radiologist are now facing the prospect of elimination of, or decreased access to, radiological services.

Lack of access to radiological services in rural communities and smaller hospitals will inevitably result in a decreased ability to provide these services in a timely fashion. Reliance on part-time radiologists can lead to delays in performing radiologic examinations, and in the case of emergencies, may necessitate transporting the patient to a medical facility with a radiologist immediately available. The inability to provide timely radiologic services will result in increased costs to the patient, loss of revenue to the health care facility from which the patient must be transported, and delayed diagnosis and treatment.

Faced with these problems, the commonly proposed solution is to utilize non-physicians to perform the initial radiologic procedures, with a radiologist later viewing the X-ray films obtained, either directly or via teleradiology equipment, and perhaps viewing videotape of the videofluoroscopic portion of these procedures. This proposed solution is not optimal for patient care.

The proposed non-physician fluoroscopists (radiologic technologists) lack the medical training, knowledge, and expertise required to properly perform these procedures. At present there is not an approved course of study for non-physicians to gain these skills which are acquired by radiologists through medical school and at least four years of post-doctoral training. Consequently, findings apparent to the radiologist at the time of fluoroscopy may not be apparent to the non-radiologist resulting in lack of filming and thereby identification of significant abnormalities. This may result in missed or delayed diagnoses and compromise patient outcomes. Lack of expertise may also increase examination time and thus unnecessarily increase radiation exposure to the patient.

A real-time diagnostic telefluoroscopy system would provide continuous remote radiologist staffing and thereby continuous fluoroscopy availability to underserved health care facilities. Patients would benefit by timely diagnosis and expedited treatment at their local health care facility, access to expert professional diagnostic services, decreased transportation costs, and by being able to receive these services in their local health care facility. Underserved health care facilities would benefit by being able to retain patients and patient revenue, thus enabling them to offer a wider range of higher quality medical services to their communities.

Prior to the general commercial availability of high volume telecommunications circuits, telefluoroscopy was not possible because available telecommunication links were not capable of handling the volume of data and video signal transmission necessary to generate live telecommunications transmitted fluoroscopic images which are diagnostically usable.

Existing medical video telecommunication transmission applications are capable of transmitting diagnostic video images, typically as part of ultrasonographic examinations, at the maximum of 288 lines of horizontal resolution at 30 frames per second. The spatial resolution of an ordinary fluoroscopic device is equal to or greater than approximately 500 lines of horizontal resolution and a temporal resolution of 30 frames per second.

It would be desirable, therefore, to have a diagnostic telefluoroscopy system and a method of performing telefluoroscopy utilizing a high volume telecommunications circuit capable of transmitting and receiving a video signal with a horizontal resolution of at least 480 lines and a temporal resolution of at least 30 frames per second. This level of spatial and temporal resolution would result in no significant image degradation compared to on-site fluoroscopic video output.

It would also be desirable to achieve this level of spatial and temporal resolution for live telecommunications transmitted ultrasonographic images, an image quality far superior to current ultrasonographic images transmitted by telecommunications circuits.

Finally, it would be desirable to provide a combined system and method of telefluoroscopy, teleradiology and ultrasonography so that a patient could undergo all, or any combination of these procedures, while radiologic professional at the patient examining site is in direct communication with a radiologist at a remote site who is viewing, interpreting and controlling the examination procedures.

SUMMARY OF THE INVENTION

It is an object of this invention to provide a method and apparatus for telefluoroscopy which generates, transmits, receives and displays live fluoroscopic images, with sufficient spatial and temporal resolution to be of medical diagnostic value, by a telecommunications circuit interconnecting a patient examining location and a remote viewing and interpretation location.

It is a further object of this invention to provide a method and apparatus for a combined system of telefluoroscopy and teleradiology which generates, transmits, receives and displays live fluoroscopic and teleradiologic images, with sufficient spatial and temporal resolution to be of medical diagnostic value, by a telecommunications circuit interconnecting a patient examining location and a remote viewing and interpretation location.

It is a further object of this invention to provide a method and apparatus for a combined system of telefluoroscopy and ultrasonography which generates, transmits, receives and displays live fluoroscopic and ultrasonographic images, with sufficient spatial and temporal resolution to be of medical diagnostic value, by a telecommunications circuit interconnecting a patient examining location and a remote viewing and interpretation location.

This invention achieves these objects and other objects and advantages which will become apparent from the description which follows by providing a method and apparatus for performing telefluoroscopy, and by providing methods and apparatus for combined systems of telefluoroscopy, teleradiology, and ultrasonography. In a preferred embodiment of the invention, a high volume, high rate telecommunications circuit is used as a telecommunications path interconnecting a patient examining site staffed with a radiologic professional and a remote viewing and interpreting site staffed with a radiologist. In this embodiment the telecommunications circuit is capable of transmitting and receiving a video signal with a minimum of 480 lines of horizontal resolution at a temporal resolution of 30 frames per second.

In an alternative embodiment of this invention, the telefluorosocopy system is combined with teleradiological and ultrasonographic imaging devices, so that the radiologist staffing the remote site can selectively view and interpret the results of fluoroscopic, radiologic, or ultrasonographic examinations performed on the same patient during the same examination procedure.

In another alternative embodiment of this invention, a remote site controlled positioning device is installed at the patient examining site and is used by the remote site radiologist during telefluoroscopic and teleradiologic exams to control patient and equipment positioning. In this embodiment, the examining site positioning device is connected to a first computer, which is interconnected to a second computer at the remote site by a telecommunications modem link, and the examining site positioning device is responsive to the second computer. This embodiment can be employed with the telefluoroscopy method and apparatus, or with the combined telefluoroscopy and teleradiology method and apparatus.

DETAILED DISCUSSION

Figure 1:
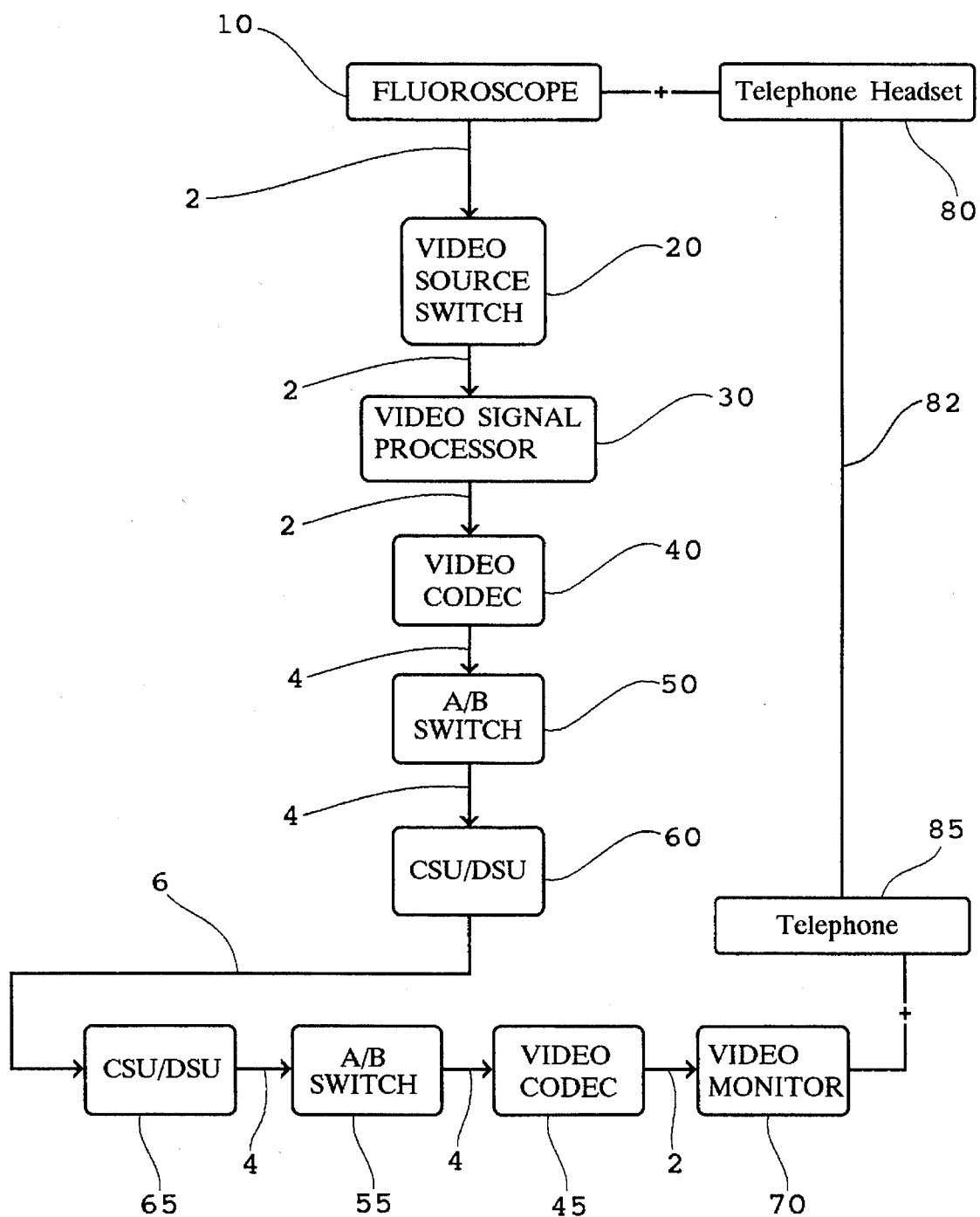
FIG. 1 Illustrates the apparatus and method used for telefluoroscopy.

The basic configuration of the new telefluoroscopic apparatus and method is shown in FIG. 1. Fluoroscope 10 comprises several component parts including an X-ray transmitting unit (not shown), a patient positioning unit (not shown), and an X-ray video image receiving unit (not shown). This invention contemplates use of known standard fluoroscopic units incorporating all of these features, and providing video output via a standard video cable 2 to a video source switch 20. The video signal is then transmitted from video source switch 20, again via standard video cabling 2, to a video signal processor 30.

Video signal processor 30 standardizes and synchronizes the video signal, using a digital time base corrector (not shown), to the NTSC video standard. Depending on the type of fluoroscope 10 utilized, video signal processor 30 may be an optional device. The need for video signal processor 30 is determined by the presence and use of different video formats and line rates which might require other video processing devices or conversely not require a video signal processor 30.

Video signal processor 30 also incorporates a freeze-frame option which is currently selected manually by the examining site radiologic professional in response to a request from the remote site radiologist. An alternative embodiment of video signal processor 30 (shown in FIGS. 1, 2, and 3) includes the additional feature of a freeze frame selection option (not shown) which would be controlled by remote site radiologist via a computer modem link (not shown) or through telecommunications circuit 6 in a 2-way communication arrangement.

The processed video signal is then transmitted via standard video cable 2 to a video coder-decoder, called a video codec 40 in FIG. 1. Video codec 40 digitizes and compresses the video signal, converting the analog video signal from video signal processor 30 to a digitized signal format capable of telecommunications transmission. Video codec 40 is interconnected to a channel service unit/data service unit, referred to as a CSU/DSU 60 by a V.35 standard communications line interface 4. However, other high speed telecommunication interface means may be used as V.35 standard communications line interface 4 in FIGS. 1, 2, and 3.

The digitized video signal output from video codec 40 is then sent through telecommunications interface 4 to CSU/DSU 60 in FIG. 1. CSU/DSU 60 is a telecommunications network device which channelizes the digital video signal output from video codec 40 and synchronizes transmission of the digital video signal with the receiving site CSU/DSU 65. In a preferred embodiment of the invention, CSU/DSU 60 is channelizing the video signal into 24 separate signal/data channels available in telecommunications circuit 6. In alternative preferred embodiments, use of telecommunications circuits with more or less than 24 channels, or even a single channel are contemplated. In the case of a telecommunications circuit 6 with only a single channel, examining site CSU/DSU 60 or its equivalent would still be used to channelize and synchronize the video signal for transmission to the remote site CSU/DSU 65.

The video signal has now been digitized, compressed, and channelized, and is ready to be transmitted over telecommunications circuit 6 to the remote site. Telecommunications circuit 6 is a dedicated, multiple location digital circuit used for transfer of data, video signals, and voice at a minimum rate of 1.344 megabits per second (1.344 Mbps). However, regardless of the data transfer rate or the compression algorithms used, telecommunication circuit 6 must be capable of handling a sufficient volume of data to enable a video signal with 480 lines of horizontal resolution and a temporal resolution of 30 frames per second to be transmitted and received. This level of spatial and temporal resolution is necessary to prevent significant image degradation compared to on-site fluoroscopic video output.

Telecommunications circuit 6 delivers the video signal to the remote site CSU/DSU 65, which dechannelizes the signal. CSU/DSU 65 then transmits the dechannelized video signal through telecommunications interface 4 to the remote video codec 45 which decompresses the video signal, performs a digital to analog conversion of the video signal, and supplies a composite NTSC video signal via a standard video cable 2 to remote site video monitor 70 for viewing and interpretation by the remote site radiologist.

Although telecommunications circuit 6 in its current form is a hardwired point-to-point telecommunications circuit, other modes of transmitting the digitized, compressed, and channelized video signal from fluoroscope 10 to a remote site are contemplated, including without limitation fiberoptic, microwave, radiofrequency, satellite and digital cellular links provided that such telecommunications circuits provide data or video signal transmission rates of at least 1.344 Mbps or any rate sufficient to generate a telecommunications transmitted video image with a minimum of 480 lines horizontal resolution and at a minimum temporal resolution of 30 frames per second.

FIG. 1 also shows that voice communication between the radiologist and radiologic technician operating fluoroscope 10 can be achieved via a standard business telephone line 82, separate from telecommunications circuit 6, with the technologist wearing a telephone headset 80 and the radiologist using telephone 85. Communication between the examining site radiologic professional and the remote site radiologist is necessary so that the remote site radiologist can instruct the examining site radiologic professional on how to physically position the patient to achieve optimum views during fluoroscopic procedures. Other modes of communication between the remote site radiologist and the examining site radiologic professional are also contemplated, including nonverbal communication using two computers interconnected by modems and a telecommunications circuit. It should also be noted that video codecs 40 and 45, CSU/DSUs 60 and 65, and telecommunications circuit 6, are capable of 2-way transmission of both video and audio signals. In the present configuration of the telefluoroscopy system, no video or audio signal is transmitted from the remote site to the examining site, where fluoroscope 10 is located, via telecommunications circuit 6. However, alternative preferred embodiments of the telefluoroscopy system are contemplated which would include 2-way transmission of audio and video signals via telecommunications circuit 6, in order to provide for communication between the remote site radiologist and the examining site radiologic professional.

Figure 2:
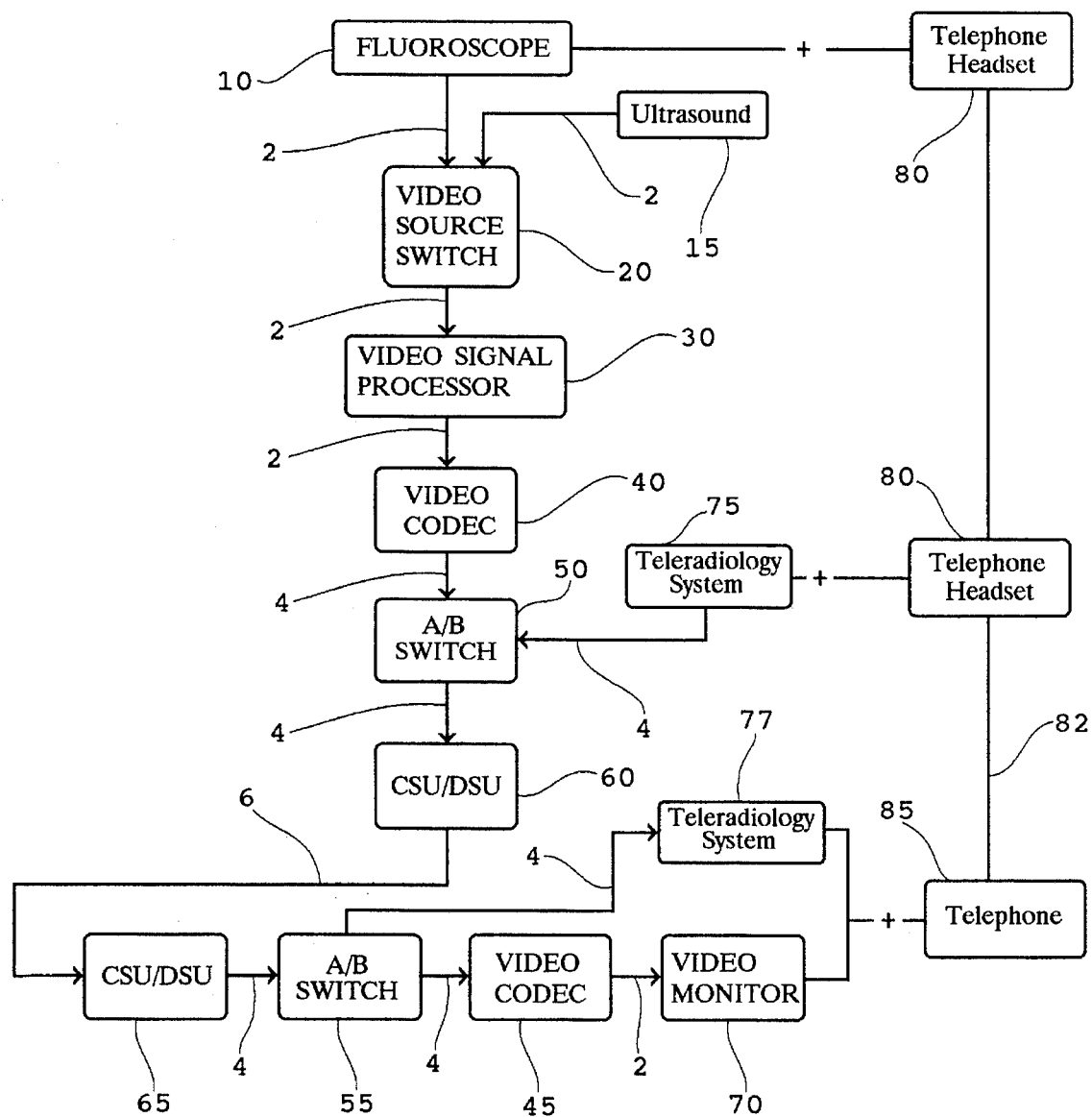
FIG. 2 Illustrates a combined system of telefluoroscopy, teleradiology, and ultrasonography FIG. 3 Illustrates an alternative embodiment of the telefluoroscopy apparatus and method incorporating a remote control positioning and exam administration control device replaces an on-site radiologic technician.

FIG. 2 shows an alternative embodiment of the telefluoroscopic apparatus and method which includes ultrasonographic imaging device 15 and teleradiology examining and transmitting apparatus 75, both located at the examining site, and remote site teleradiology receiving and display apparatus 77. Ultrasonographic, teleradiological, and telefluoroscopic exams can all be performed on the same patient, and viewed and interpreted by the remote site radiologist, during a single exam procedure using the apparatus shown in FIG. 2. In this combined system, live diagnostic ultrasound images originating from ultrasonographic imaging device 15 at the examining site are transmitted via telecommunications circuit 6 to video monitor 70 at a remote site (see FIGS. 2 and 3) at 480 lines of horizontal resolution at 30 frames per second, an image quality far superior to current ultrasonographic applications.

In the method and apparatus for the combined system shown in FIG. 2, fluoroscope 10 provides video output via a standard video cable 2 to a video source switch 20. Ultrasonographic imaging device 15 also provides video output via standard video cable 2 to video source switch 20. The examining site radiologic professional can operate video signal source switch 20, thereby selecting either the video signal from fluoroscope 10 or ultrasonographic imaging device 15 to be transmitted via standard video cabling 2 to a video signal processor 30. Video signal processor 30 standardizes and synchronizes the video signal, using a digital time base corrector (not shown), to the NTSC video standard. Depending on the type of fluoroscope 10 or ultrasonographic imaging device 15 utilized, video signal processor 30 may be an optional device. The need for video signal processor 30 is determined by the presence and use of different video formats and line rates which might require other video processing devices or conversely not require a video signal processor 30.

The processed video signal is then transmitted via standard video cable 2 to video codec 40 in FIG. 2. Video codec 40 digitizes and compresses the video signal, converting the analog video signal from video signal processor 30 to a digitized signal format capable of telecommunications transmission. Video codec 40 is interconnected by a V.35 standard communications line interface 4 to A/B switch 50, which allows for switching at the examining site between teleradiology system 75 and either fluoroscopy system 10 or ultrasonographic imaging device 15. The selected video signal output from A/B switch 50 is transmitted to CSU/DSU 60 by a V.35 standard communications line interface 4. CSU/DSU 60 then channelizes the digital video signal output from video codec 40 and synchronizes transmission of the digital video signal with the receiving site CSU/DSU 65.

The video signal has now been digitized, compressed, and channelized, and is now ready to be transmitted over telecommunications circuit 6 to the remote site. Telecommunications circuit 6 delivers the video signal to the remote site CSU/DSU 65, which dechannelizes the signal. CSU/DSU 65 then transmits the dechannelized video signal through telecommunications interface 4 to the remote A/B switch The remote site A/B switch 55 allows the remote site radiologist to select either the remote site teleradiology system 77 or the remote site telefluoroscopy video monitor 70 for viewing and interpretation.

If the remote site radiologist selects the remote site teleradiology system 77, there is no need for the video signal to be processed by remote site video codec 45, as the video signal was not initially compressed or digitized by the examining site codec 40 prior to transmission over telecommunications circuit 6. The signal processing by video codecs 40 and 45 is only necessary for full motion video signals, not for still video images generated by teleradiology devices 75 and 77.

If the remote site radiologist does not select the remote site teleradiology system 77, and desires to view images generated by either fluoroscope 10 or ultrasonographic imaging device 15, the video signal output from A/B switch 55 is transmitted via a telecommunications interface 4 to video codec 45. Video codec 45 decompresses the video signal, performs a digital to analog conversion to the video signal, and supplies a composite NTSC video signal via a standard video cable 2 to remote site video monitor 70 for viewing and interpretation by the remote site radiologist.

FIG. 2 also shows voice communication between the radiologist and radiologic technician operating fluoroscope 10, or ultrasonographic imaging device 15, or teleradiology device 75, which can be achieved via a standard business telephone line 82, separate from telecommunications circuit 6, with the technologist wearing a telephone headset 80 and the radiologist using telephone 85. The communications link between the examining site radiologic professional and the remote site radiologist operates the same way in the embodiment shown in FIG. 2 as in the embodiment shown in FIG. 1, except that patient position and exam administration during ultrasonographic and teleradiologic procedures can be also controlled by the remote site radiologist in the embodiment shown in FIG. 2.

Figure 3:
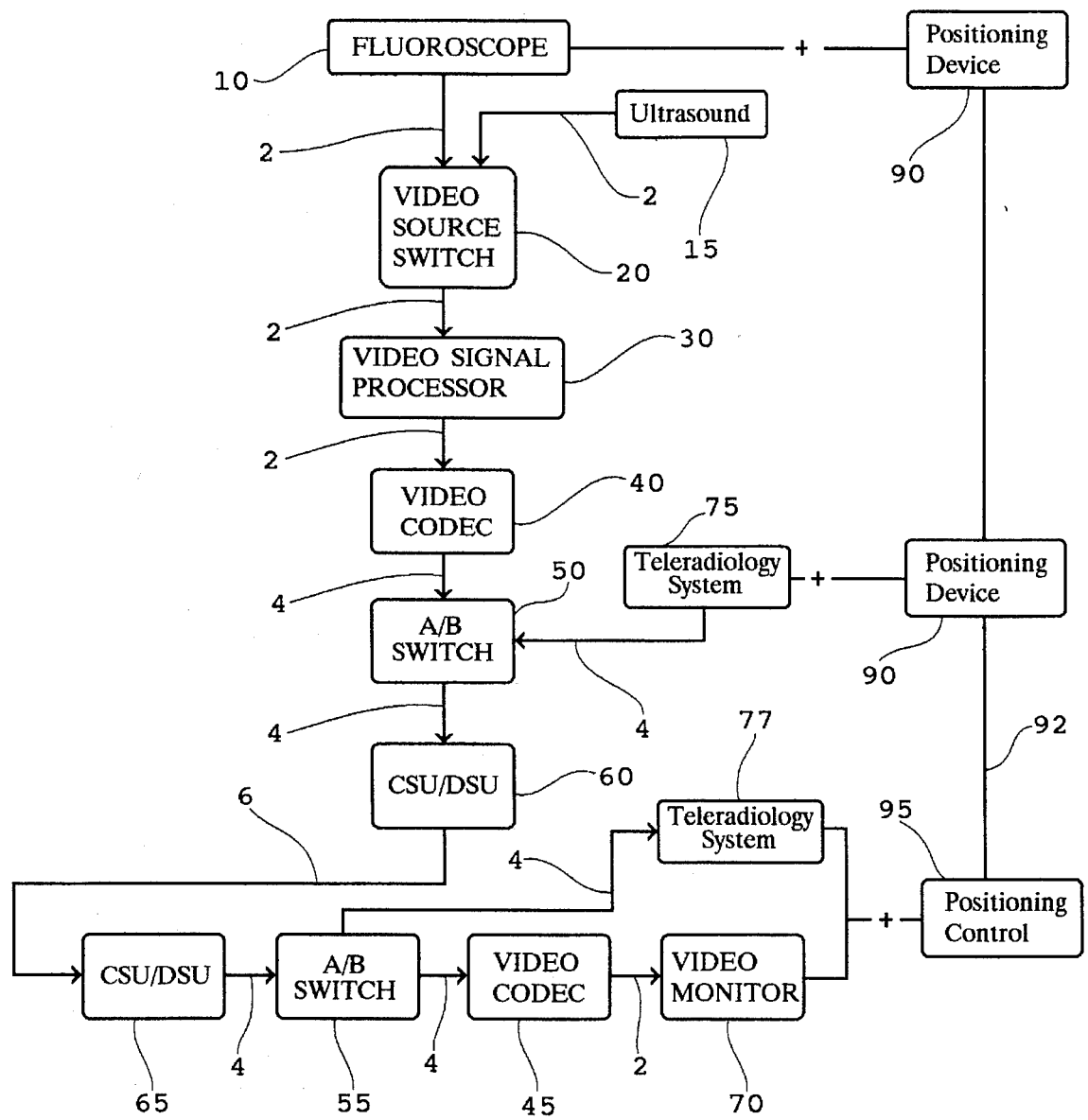

FIG. 3 shows an alternative embodiment of the method and apparatus for the telefluoroscopic system shown in FIG. 2. In this embodiment, the remote site radiologist controls patient positioning and exam administration via a positioning device 90, which is connected to a first computer (not shown) at the examining site linked to a second computer (not shown) at the remote site via telecommunications modem link 92. Positioning device 90 allows the remote site radiologist to directly alter patient position and otherwise control X-ray exam administration without assistance at the examining site. As shown in FIG. 3, positioning device 90 is used to control patient positioning and exam administration during teleradiological procedures as well as during telefluoroscopic procedures. In another alternative preferred embodiment, the 2-way transmission capability of video codecs 40 and 45, CSU/DSUs 60 and 65, and telecommunications circuit 6 is used to function as telecommunications modem link 92. Remote control of patient position or exam administration during ultrasonographic procedures is not economically feasible at this time because of the use of hand held ultrasonic transducers to perform such examinations.

In another alternative embodiment of this invention, not shown in the drawings, telephone headset 80 in FIG. 1 is replaced by positioning device 90, telephone 85 in FIG. 1 is replaced by positioning controller 95, and telephone circuit 82 in FIG. 1 is replaced by telecommunications modem link 92. This embodiment operates in the same manner as the embodiment shown in FIG. 3, and described above, except that it is applied to the telefluoroscopy method and apparatus which is not in combination with a teleradiology system.

The following equipment has been successfully used by the inventor for various components of this new apparatus:

A Fluoricon compact, Monitrol/15, and a DXS 650 II, all manufactured or sold by General Electric Medical Systems, Milwaukee, Wis., has been successfully used as Fluoroscope 10, although other commercially available equipment capable for performing an equivalent function are contemplated for use in this invention.

An Ultramark IV Plus, manufactured by Advanced Technology Laboratories, Inc., Bellevue, Wash., has been successfully used as Ultrasonographic imaging device 15, although other commercially available equipment capable for performing an equivalent function are contemplated for use in this invention.

75 ohm shielded coaxial cable, manufactured by Tandy Corporation has been successfully used as standard video cable 2, although other commercially available equipment capable for performing an equivalent function are contemplated for use in this invention.

A Video/Audio Selector switch box, manufactured by Tandy Corporation, has been successfully used as Video Source Switch 20, although other commercially available equipment capable for performing an equivalent function are contemplated for use in this invention.

A Model IVT-7, manufactured by ICON Video, Inc., Santa Anna, Calif., has been successfully used as Video Signal Processor 30 (including digital time base correction features), although other commercially available equipment capable for performing an equivalent function are contemplated for use in this invention.

A Rembrandt II/VP with Picture Quality 3 and CTX Plus, manufactured by Compression Labs, Inc., San Jose, Calif., has been successfully used as Video Codecs 40 and 45, although other commercially available equipment capable for performing an equivalent function are contemplated for use in this invention.

V.35 interface cabling, manufactured by Atlanta Cable, Atlanta, Ga., has been successfully used as standard telecommunications interface 4, although other commercially available equipment capable for performing an equivalent function are contemplated for use in this invention.

A V.35 A/B switch box, manufactured by Eazy, Inc., Atlanta, Ga., has been successfully used as A/B Switches 50 and 55, although other commercially available equipment capable for performing an equivalent function are contemplated for use in this invention.

A Lumisys laser digitizer, with a 2K×2.5K matrix feed, and a PACSPRO computer workstation, all of which are either manufactured or sold by Advanced Video Products, Westford, Mass., has been successfully used as Teleradiology System 75, although other commercially available equipment capable for performing an equivalent function are contemplated for use in this invention.

A NFS 2.2 Network file server, and a PACSPRO computer workstation, with a Megascan 2K portrait model monitor, all or which are either manufactured or sold by Advanced Video Products, Westford, Mass., has been successfully used as Teleradiology System 77, although other commercially available equipment capable for performing an equivalent function are contemplated for use in this invention.

A Datasmart T1 Quadport Add/Drop, manufactured by ADC/Kentrox, has been successfully used as CSU/DSUs 60 and 65 (channel service unit/data service units), although other commercially available equipment capable for performing an equivalent function are contemplated for use in this invention.

A DS1 telecommunications circuit (commonly referred to as T-1 or 1.544 Mbps service), provided by US West Communications, has been successfully used as telecommunications circuit 6, although other commercially available equipment capable for performing an equivalent function are contemplated for use in this invention.

A high resolution video monitor with 560 lines of horizontal resolution, model PVM-2030, manufactured by Sony, has been successfully used as Video Monitor 70, although other commercially available equipment capable for performing an equivalent function are contemplated for use in this invention.

A Mirage model telephone headset, manufactured by Plantronics, Inc., Santa Cruz, Calif., has been successfully used as Telephone Headset 80, although other commercially available equipment capable for performing an equivalent function are contemplated for use in this invention.

A standard telephone and telephone line, provided by United Telco, Sunnyside, Wash., has been successfully used as Telephone 85 and telephone line 82 connecting telephone 85 with telephone headset 80, although other commercially available equipment capable for performing an equivalent function are contemplated for use in this invention.

In compliance with the statutes, the invention has been described in language more or less specific as to structural features. While this invention is susceptible to embodiment in different forms, the drawings in the specification illustrate preferred embodiments of the invention, with the understanding that the present disclosure is to be considered an exemplification of the principles of the invention, and the disclosure is not intended to limit the invention to the particular embodiments described.

I claim:

1. A system for performing telefluoroscopy for medical diagnosis comprising fluoroscopic medical examination means;

video signal processing means for processing the video signal output from said fluoroscopy means into a NTSC compatible analog video signal;

a first video coder-decoder means at a patient examining site for digitizing and compressing said NTSC compatible analog video signal;

a first channel service unit/data service unit means at said examining site for channelizing and synchronizing said digitized and compressed video signal for telecommunications transmission to a second channel service unit/data service unit means;

telecommunications means interconnecting said first channel service unit/data service unit means with a second channel service unit/data service unit means at a remote site, said telecommunications means transmitting said channelized and synchronized video signal from said first channel service unit/data service unit means to said second channel service unit/data service unit means, said telecommunications means capable of transmitting and receiving video signals at such a rate and volume of data exchange to achieve at least 480 lines of horizontal resolution and a temporal resolution of at least 30 video frames per second on a receiving video monitor;

a second channel service/data service means at a remote site for receiving and dechannelizing said telecommunications transmitted video signal;

a second video coder-decoder means at said remote site for decompressing said telecommunications transmitted video signal and for performing a digital to analog conversion of said telecommunications transmitted video signal, so that the video signal output from the video coder-decoder means is a NTSC compatible analog video signal; and receiving video monitor means at said remote site for displaying said NTSC compatible analog video signal as a video image with a horizontal resolution of at least 480 lines and a temporal resolution of at least 30 video flames per second;

a communications means between the operator of said fluoroscopy examining means at said examining site and a radiologist at said remote site, said communication means providing communication between said operator at said examining site and said radiologist at said remote site simultaneously with the administration of the telefluoroscopic examination.

2. The telefluoroscopy system of claim 1, wherein said receiving video monitor means is used to optionally display either ultrasonographic video images or telefluoroscopic video images, and further comprising ultrasonographic examining means; and video source signal switching means connected to said video signal processing means and connected to both said fluoroscopic examining means or said ultrasonographic examining means.

3. The telefluoroscopy assembly of claim 1, further comprising teleradiological examining means;

teleradiological video monitor means for receiving and displaying teleradiologic video images;

a first switching means connected to said first channel service unit/data service unit means and optionally switched to allow transmission of video signals from either said fluoroscopic examining means or said teleradiological examining means; and a second switching means connected to said second channel service unit/data service unit means and optionally switched to allow display of video signals by either said receiving video monitor means or said teleradiological video monitor means.

4. The telefluoroscopy assembly of claim 1, further comprising fluoroscopy means at said examining site including a first computer controlling a patient positioning means;

a second computer at the said remote site;

a communications path interconnecting said first computer and said second computer; and means responsive to said second computer at said remote site and incorporating said communications path for controlling said first computer at said examining site to control said patient positioning means.

5. The combined telefluoroscopy and teleradiology system of claim 3, further comprising teleradiological means at said examining site including a first computer controlling a patient positioning means;

a second computer at the said remote site;

a communications path interconnecting said first computer and said second computer; and means responsive to said second computer at said remote site and incorporating said communications path for controlling said first computer at said examining site to control said patient positioning means.

6. A system for performing telefluoroscopy for medical diagnosis comprising a fluoroscope;

a video signal processor for processing the video signal output from said fluoroscope into a NTSC compatible analog video signal;

a first video coder-decoder at a patient examining site which digitizes and compresses said NTSC compatible analog video signal so that said digitized and compressed video signal is capable of telecommunications transmission;

a first channel service unit/data service unit at said examining site which channelizes and synchronizes said digitized and compressed video signal for telecommunications transmission to a second channel service unit/data service unit;

a telecommunications path interconnecting said first channel service unit/data service unit with a second channel service unit/data service unit at a remote site, said telecommunications path transmitting said channelized and synchronized video signal from said first channel service unit/data service unit to said second channel service unit/data service unit, said telecommunications path capable of transmitting and receiving video signals at such a rate and volume of data exchange to achieve at least 480 lines of horizontal resolution and a temporal resolution of at least 30 video frames per second on a receiving video monitor;

a second channel service unit/data service unit at said remote site which receives and dechannelizes said telecommunications transmitted video signal;

a second video coder-decoder at said remote site which decompresses said telecommunications transmitted video signal and performs a digital to analog conversion of said telecommunications transmitted video signal, so that the video signal output from said second video coder-decoder is an NTSC compatible analog video signal; and receiving video monitor for displaying said NTSC compatible analog video signal as a video image with a horizontal resolution of at least 480 lines and a temporal resolution of at least 30 video frames per second;

a communications link between the examining site radiologic professional and the remote site radiologist, said communication link providing communication between said examining site radiologic professional and said remote site radiologist simultaneously with the administration of the telefluoroscopic examination.

7. The telefluoroscopy assembly of claim 6, wherein said receiving video monitor is used to optionally display either ultrasonographic video images or telefluoroscopic video images, and further comprising ultrasonographic imaging device; and video source signal switch connected to said video signal processor and connected to both said fluoroscope or said ultrasonographic imaging device.

8. The telefluoroscopy assembly of claim 6, further comprising a teleradiological imaging device;

a teleradiological video monitor for receiving and displaying teleradiologic video images;

a first switch connected to said first channel service unit/data service unit and optionally switched to allow transmission of video signals from either said fluoroscopic or ultrasonographic imaging device and said teleradiological imaging device; and a second switch connected to said second channel service unit/data service unit and optionally switched to allow receipt of video signals by either said receiving video monitor or said teleradiological video monitor.

9. The telefluoroscopy assembly of claim 8, further comprising teleradiological imaging device at said examining site including a first computer controlling a patient positioning means;

a second computer at the said remote site;

a communications path interconnecting said first computer and said second computer; and a patient positioning control device responsive to said second computer at said remote site and incorporating said communications path for controlling said first computer at said examining site to control said patient positioning control device.

10. The telefluoroscopy assembly of claim 6, further comprising a fluoroscope at said examining site including a first computer controlling a patient positioning control device;

a second computer at the said remote site;

a communications path interconnecting said first computer and said second computer; and a patient positioning control device responsive to said second computer at said remote site and incorporating said communications path for controlling said first computer at said examining site to control said patient positioning control device.

11. A method for performing telefluoroscopy for medical diagnosis comprising performing a fluoroscopic medical examination;

processing the video signal output resulting from said fluoroscopy examination into a NTSC compatible analog video signal;

digitizing and compressing said NTSC compatible analog video signal at a patient examining site using a first video coder-coder;

channelizing and synchronizing said digitized and compressed video signal, using a first channel service unit/data service unit for telecommunications transmission to a second channel service unit/data service unit;

transmitting said channelized and synchronized video signal via a telecommunications circuit from said first channel service unit/data service unit at said examining site to a second channel service unit/data service unit at said remote site, said telecommunications transmission operating at such a rate and volume of data exchange to achieve at least 480 lines of horizontal resolution and a temporal resolution of at least 30 video frames per second on a receiving video monitor;

receiving and dechannelizing said telecommunications transmitted video signal by said second channel service/data service unit at said remote site;

decompressing said dechannelized video signal telecommunications transmitted video signal, and for performing a digital to analog conversion of said decompressed video signal, so that said decompressed and converted video signal output from the said second video coder-decoder is a NTSC compatible analog video signal; and displaying on a receiving video monitor at said remote site said NTSC compatible analog video signal as a video image with a horizontal resolution of at least 480 lines and a temporal resolution of at least 30 video frames per second;

communication between the operator of said fluoroscopy examining means at said examining site and a radiologist at said remote site, said communication occurring simultaneously with the administration of the telefluoroscopic examination.

12. The telefluoroscopy method of claim 11, wherein said receiving video monitor is used to optionally display either ultrasonographic video images or telefluoroscopic video images, and further comprising performing an ultrasonographic examination; and selecting video signal output for said video signal processing from either said fluoroscopic examination or said ultrasonographic examination by use of a video source signal switch.

13. The telefluoroscopy assembly of claim 11, further comprising performing a teleradiological examination;

selecting video signal output from said fluoroscopic examination or said teleradiological examination by use of a first switch connected to said first channel service unit/data service unit;

selecting video signals from said fluoroscopic examination or said teleradiological examination for display at said remote site by use of a second switch connected to said second channel service unit/data service unit;

displaying video images selected from said fluoroscopic examination or said teleradiological examination by use of said receiving video monitor or said teleradiological video monitor.

14. The combined telefluoroscopy and teleradiology method of claim 13, further comprising performing a teleradiological examination at said examining site and connecting a first computer to a patient positioning device;

establishing a communications path interconnecting said first computer with a second computer at the said remote site, and making said first computer responsive to said second computer; and controlling patient position at said examining site by said second computer at said remote site.

15. The telefluoroscopy method of claim 11, further comprising performing a fluoroscopic examination at said examining site and connecting a first computer to a patient positioning device;

establishing a communications path interconnecting said first computer with a second computer at the said remote site, and making said first computer responsive to said second computer; and controlling patient position at said examining site by said second computer at said remote site.

* * * * *

UNITED STATES PATENT AND TRADEMARK OFFICE
CERTIFICATE OF CORRECTION

PATENT NO. : 5,482,043
DATED : Jan 9, 1996
INVENTOR(S) : David R.P. Zulauf

It is certified that error appears in the above-indentified patent and that said Letters Patent is hereby corrected as shown below:

Column 1, line 33, after the word "When" insert the following text:

--using this new method and apparatus for telefluoroscopy, the site where the fluoroscopic exam is administered is geographically separated from the site where a radiologist views the transmitted video image.

Fluoroscopic spot-films consist of one or more radiographs, consisting of filmed X-ray images, obtained during the course of the videofluoroscopic examination. Proper spot filming depends on the professional knowledge and expertise of the examining physician and the findings noted at the time of the fluoroscopic examination. The number and location of the radiographs thus obtained are under the control of the examining physician. When using this new method and apparatus for telefluoroscopy, the number and location of the radiographs are under the control of an examining physician who is at a site geographically separated from the site where a fluoroscopy is being performed.

Following the videofluoroscopic examination, overhead X-ray films may also be obtained. Overhead X-ray films are a series of radiographs obtained by a ceiling-mounted X-ray tube. Specific views may be added or deleted depending on findings identified during videofluoroscopy. The videofluoroscopic examination is deemed complete when these views have been reviewed for proper positioning and exposure by the radiologist performing the examination, and the overhead X-ray film of each selected view is obtained.

UNITED STATES PATENT AND TRADEMARK OFFICE
CERTIFICATE OF CORRECTION

PATENT NO. : 5,482,043          Page 2 of 2
DATED      : Jan 9, 1996
INVENTOR(S) : David R.P. Zulauf It is certified that error appears in the above-indentified patent and that said Letters Patent is hereby corrected as shown below:

At present, fluoroscopic procedures are performed by qualified health care professionals, usually radiologists, who are physically present in the examining suite with the patient. In rural communities, and smaller hospitals, there is often--

Signed and Sealed this

Twenty-sixth Day of March, 1996

Attest:

BRUCE LEHMAN

Attesting Officer     Commissioner of Patents and Trademarks